Sept. 21, 1954

J. F. CURRIVAN 2,689,636

MULTIPLE LOADER

Filed Jan. 9, 1950

INVENTOR
John F. Currivan

BY Strauch, Nolan & Diggins
Attorneys

Sept. 21, 1954   J. F. CURRIVAN   2,689,636
MULTIPLE LOADER
Filed Jan. 9, 1950
3 Sheets-Sheet 2

INVENTOR
John F. Currivan
BY Strauch, Nolan + Diggins
Attorneys

Sept. 21, 1954     J. F. CURRIVAN     2,689,636
MULTIPLE LOADER
Filed Jan. 9, 1950     3 Sheets-Sheet 3
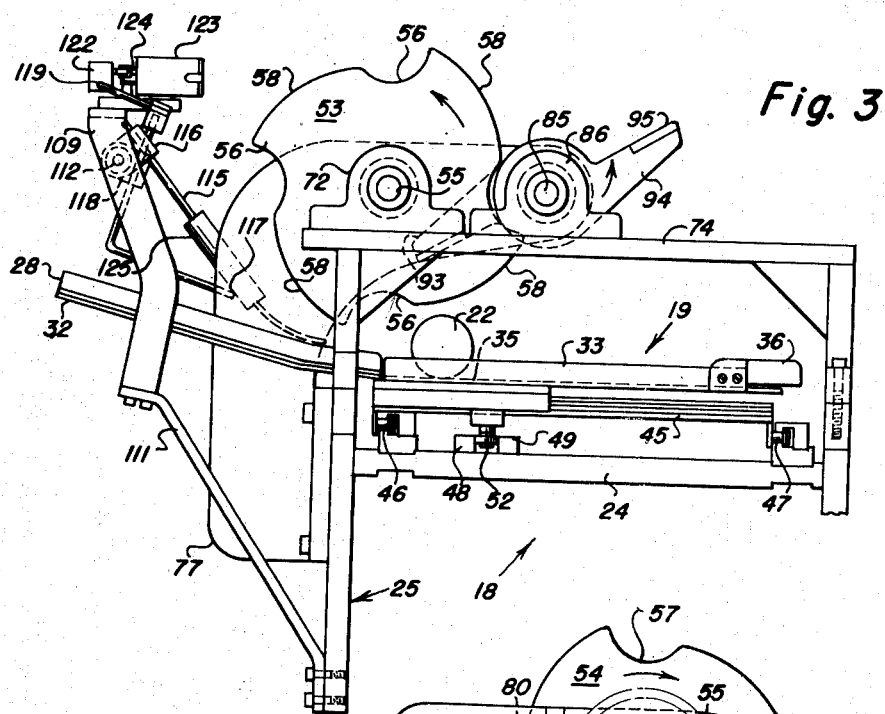
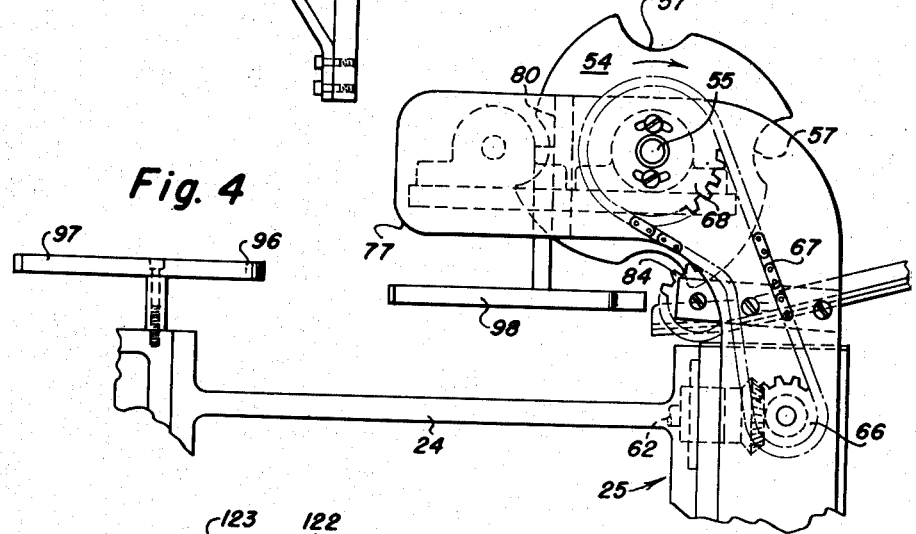
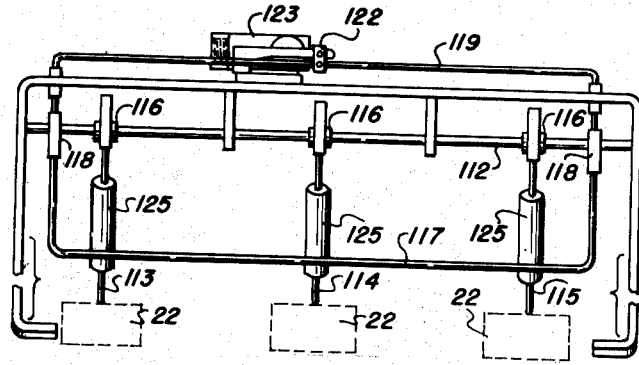
INVENTOR
John F. Currivan
By Strauch, Nolan & Diggins
Attorneys Patented Sept. 21, 1954

2,689,636

UNITED STATES PATENT OFFICE 2,689,636

MULTIPLE LOADER

John F. Currivan, Stuyvesant, N. Y., assignor, by mesne assignments, to Emhart Manufacturing Company, a corporation of Delaware Application January 9, 1950, Serial No. 137,631

14 Claims. (Cl. 198—26)

This invention relates to cartoning machines for inserting articles of merchandise into cartons, and in particular to such a machine wherein several articles are simultaneously loaded into a carton before it is sealed or otherwise closed.

While the invention may be used with intermittently moving cartoning machines it is particularly useful in a machine that operates uninterruptedly and at a substantially uniform controlled speed, as disclosed in the copending application of Alexander H. Ross, Serial No. 731,395 filed February 27, 1947 for Cartoning Machine and now Patent No. 2,662,355. In the machine therein disclosed the cartons are loaded while they are moving at a uniform speed past a loading station. Consequently, in order to prevent interference with the moving erected cartons, the articles to be loaded therein are moved at the same rate of speed as the cartons and in the same direction, until the time when the loading station is reached, whereupon the articles are given a transverse movement simultaneous with the aforesaid movement, so that they are pushed into the cartons while the cartons are moving at the aforesaid uniform speed.

The machine disclosed in said application Serial No. 731,395 is characterized by an endless series of receptacles or buckets which carry the articles to be cartoned, said buckets having a general path parallel and substantially coplanar with the cartons, but with an additional transverse movement towards the cartons, so that at the loading station the buckets are moving with the cartons, but shift to a position closely adjoining the open ends of the cartons, so that the articles carried by the buckets may be pushed from the buckets into the open ends of the adjoining cartons. The same aforesaid application Serial No. 731,395 shows plungers within the buckets that are effective to eject the articles from the buckets and insert them into the open ends of the cartons, as well as a loading device for loading single generally cylindrical articles into the buckets for subsequent insertion into the cartons.

It is in the loading of articles of merchandise into the receptacles or buckets with which this invention is concerned although it is to be understood that in the sense that a carton carried by a transport may be considered to be a receptacle carried by a conveyor, this invention is also concerned with the loading or transfer of a multiple number of articles from a number of conveyors to a single conveyor or receptacle carried by the single conveyor.

With the development of the frozen food industry has come a tremendous interest in the sale and purchase of frozen food in lots ranging from single servings to what may be considered to be "large lot" purchases. Some frozen foods, particularly those packed in metallic cans, may often have a coating of ice thereover, formed by the freezing of moisture condensed on the cold cans. Some people have been found to have a distinct aversion to the handling of such ice coated cans, with the result that an otherwise perfectly salable product may move relatively slowly, due principally to the formation of an ice coating on the cans. While the use of waxed paper cartons may prevent the formation of such ice to a considerable degree, at the present time only relatively strong containers, such as tin cans have been found entirely suitable for the shipment over long distances of such foods as frozen fruit juices or the like, while solid articles such as vegetables, fruits, or the like may be advantageously packed in waxed paper cartons. It is relatively expensive to place each can of frozen liquid, such as fruit juice, in a separate carton, but if a multiple number of such cans is placed in a carton the cost of the carton may be thus rendered relatively negligible. For example, it is relatively inexpensive, and will actually add substantially nothing to the cost, if three or more cans of frozen fruit concentrate are packed in a paper or cardboard carton, which carton will normally not have any coating of frozen condensation on its surface, although the cans contained therein may have such a coating. In the packing of a number of cylindrical articles into a carton it is most advantageous to have the cylindrical articles arranged with their axes in spaced parellel relationship so that the flat bottoms of the articles will rest upon one common bottom wall of the carton. In adapting the machine disclosed in the aforesaid application Serial No. 731,395 to handle cartons that will hold the cylindrical cans or the like it has been found most advantageous that the three cans be pushed into the cartons simultaneously rather than singly. It has also been found advantageous that each receptacle or bucket on the loading conveyor be adapted to handle three (or any suitable number) of the cans, rather than having one carton loaded by the ejection of cans from three succeeding buckets, because that in such event the conveyor carrying the articles to be loaded will have to travel faster than the transport carrying the cartons.

It is therefore a primary object of the invention to provide a new and improved system for loading a multiple number of articles of merchandise into a carton through an open part thereof before the carton is closed.

It is another primary object of the invention to provide a novel system for loading a multiple number of articles onto a continuously moving conveyor.

It is another important object of the invention to provide a new and improved apparatus for loading a multiple number of articles one at a time into continuously moving receptacles on a first conveyor and then to transfer at one time all of the articles so loaded into a second receptacle or conveyor moving at a steady speed.

Another important object is the provision of a safety or automatic cut-off device that will stop the machine if because of some circumstance there is no article of merchandise ready or in place to be loaded into the first or intermediate conveyor.

Other objects will become apparent as the description progresses in connection with the accompanying drawings, wherein:

Figure 3 is a side elevation of Figure 2, as it appears from the left of Figure 2.

Figure 4 is a side elevation of Figure 2 as it appears from the right of Figure 2.

Figure 5 is a side elevation substantially as it appears from the left of Figure 3 showing details of the stop mechanism.

Figure 1:
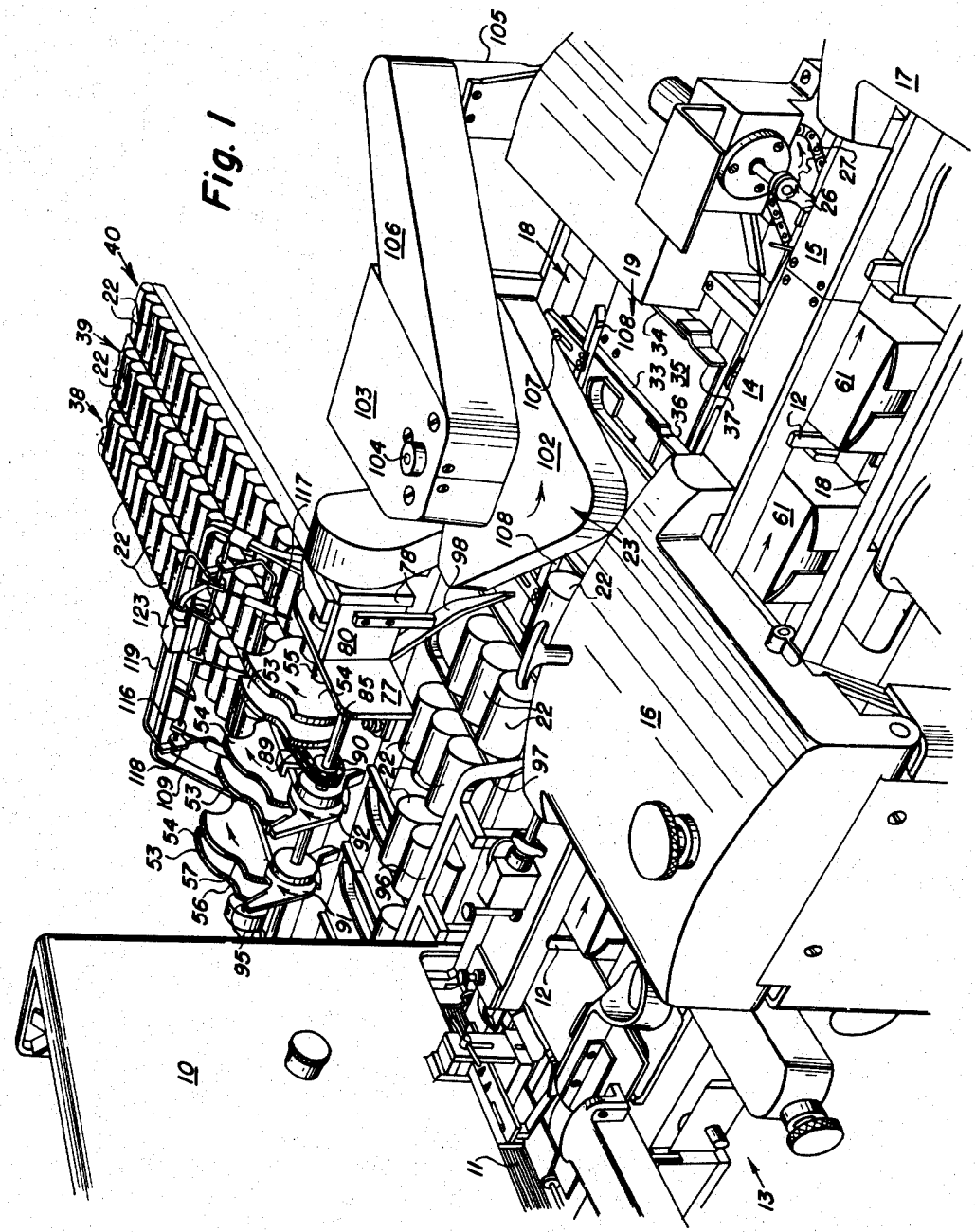
Figure 1 is a perspective view of the entire machine.

Referring to Figure 1 wherein a complete cartoning machine is illustrated, 10 designates a magazine for a stack of flattened cartons indicated at 11. As described in the aforesaid application Serial No. 731,395 the flattened cartons are removed one by one from the bottom of the stack by a feeder (not visible in Figure 1) which delivers them to sets of spaced fingers 12 on the cartoning machine transport indicated generally at 13. The sets of fingers are effective, first to erect or square the cartons and then move them to the right as viewed in Figure 1 while they are loaded and their end flaps closed. Longitudinally extending horizontal hold down bars 14 and 15 carried by overarm assemblies 16 and 17 hold the erected cartons against the upper surfaces of table plates 18 while they are being loaded and then end flaps closed.

As also described in the aforesaid application Serial No. 731,395 a loading conveyor 18 is arranged along side the transport 13 and carries an endless series of receptacles or buckets 19 along a working run that is parallel to the movement of the cartons, and wherein the buckets with the merchandise articles 22 therein move at the same speed as the cartons, the loading conveyor being driven by the transport. As the loaded buckets approach the loading station they are shifted laterally toward the open end of the cartons until they engage or adjoin them, whereupon a pushing device, indicated generally at 23 pushes the articles from the buckets and into the open ends of the cartons. Each following bucket follows the same path and is emptied in the same manner, after which each bucket is automatically shifted laterally back to its initial position before they complete the end of their loading run and commence their return or idle run beneath a horizontal web 24 (Figures 3 and 4) of an H-shaped casting 25 that forms the main supporting frame of the loading conveyor 18. As will be apparent from Figure 1, the aforementioned loading station, where the articles 22 are pushed into the cartons, is substantially abreast of the overarm assembly 16, it being understood that in the illustrated embodiment the cartoons move at a uniform speed along the transport even while being loaded. After the cartons have been loaded they continue their movement along the transport while their end flaps are closed, as by stationary plows, not shown, or by rotating devices such as the finger 26 (Figure 1) driven in timed relationship with the moving cartons by a sprocket chain 27 that is driven from the transport 13.

In the illustrated machine the merchandise articles 22 are 6 ounce cans of frozen fruit juice concentrate. They are so cold as to be difficult to handle and they must be cartoned as they arrive from the freezer and before they warm up. Over three hundred cans may be cartoned per minute, and with three cans being loaded into each carton the cartons are loaded at a rate of over one hundred a minute. For that reason it would be virtually impossible for a person to correctly place three cans in each bucket by hand, with the buckets moving past him at such a rate of speed. The loading of the buckets is accomplished by automatic mechanism now to be described.

Three parallel inclined chutes lead from a suitable freezer discharge mechanism and allow three rows of cans 22 (Figure 1) to approach the cartoning machine. The exact construction of the cutes is immaterial, but at least in the region adjoining the loading conveyor they are shown (Figures 2 and 3) as comprising three spaced pairs of angle members 28 and 29 having vertical legs that guide the three rows of cans. The cans rest upon an inclined supporting plate 32 that underlies all of the members 28 and 29 and is suitable affixed at its lower end to a top edge portion of the outer wall of the loading conveyor casting 25.

One of the buckets 19 is shown in side elevation in Figure 3. It is open at both ends so that the cans 22 can enter at one end and be pushed off the other end into the carton, but it has spaced side walls 33 and 34 (Figure 1) to hold and guide the cans as they enter and leave the bucket. As best seen in Figure 3 the top surface of the inclined supporting plate 32 terminates adjacent and in the same plane as the top surface of the bottom wall 35 of the bucket. If desired, the bottom wall 35 of the bucket may be sloped downwardly from its inlet to its outlet end to allow the cans 22 to roll toward the outlet end by gravity. In any event, whether the bucket bottom is inclined or not, it is provided with resilient brake means to keep the cans 22 from rolling out of the discharge end of the bucket until they are forcefully pushed out. These take the form of short leaf springs 36 and 37 (Figures 1 and 2) suitably affixed to the side walls 33 and 34 adjacent the discharge end of the bucket. The distance between the springs 36 and 37 is slightly less than the length of cans 22, so that although they will grip the can to keep it from rolling out of the bucket under the force of gravity or momentum, they will permit the cans to pass out of the bucket and into a carton under the influence of a positive force exerted by a pusher or the like. These springs 36 and 37 may project slightly beyond the end of the bucket bottom 35 so that when the bucket has been shifted to a position adjacent the open end of a carton the fingers may actually extend slightly into the carton.

Figure 2:
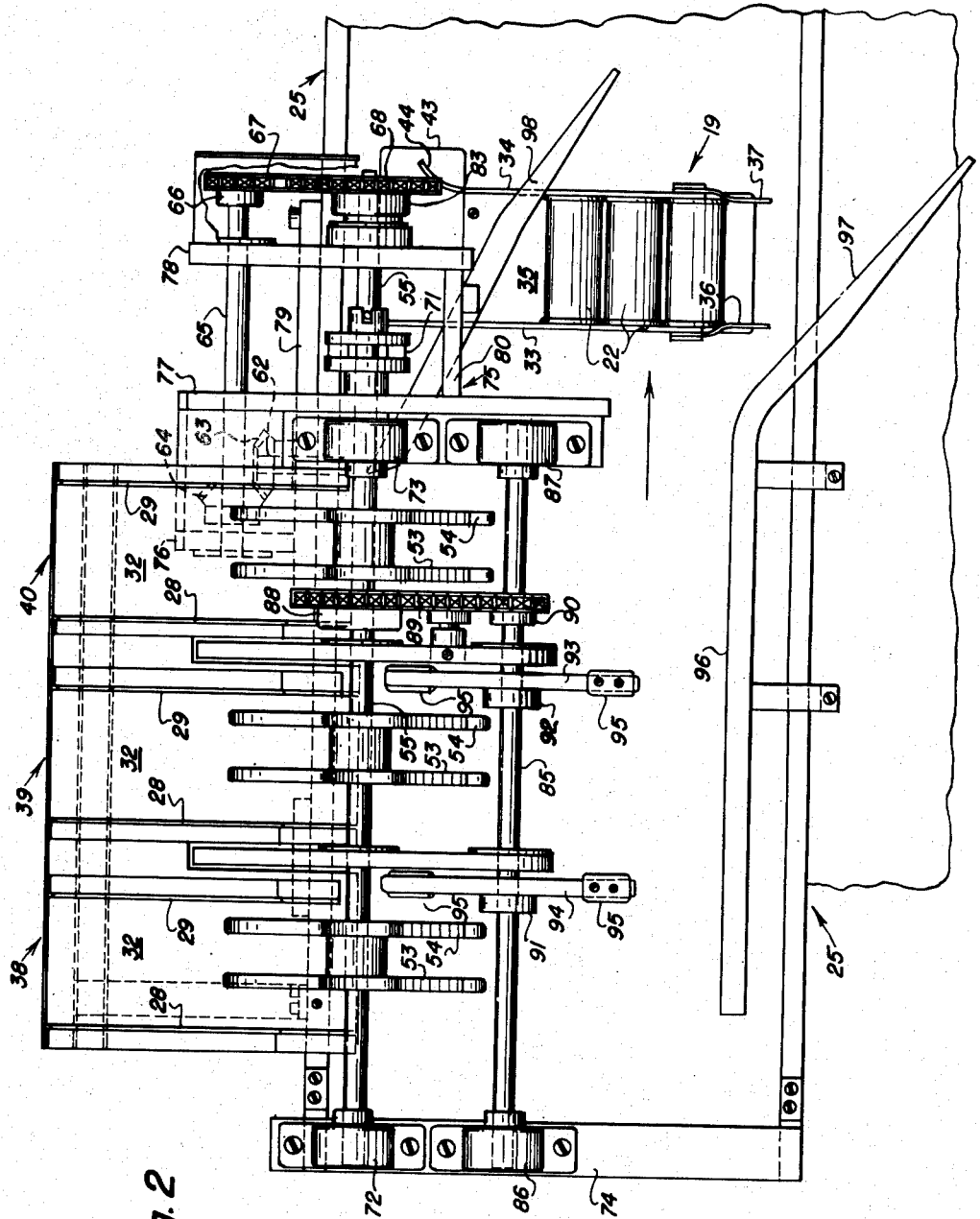
Figure 2 is a top plan view of the portion of the transfer mechanism for loading receptacles or buckets with a multiple number of articles, some of the parts being omitted.

Referring to Figures 1 and 2 the three inclined chutes are designated generally by the numbers 38, 39 and 40. It will be apparent from Figure 1 that any single bucket 19 receives a can 22 from the first chute 38, a second from chute 39, and a third from chute 40. Each of the cans is received while the bucket is moving at a steady speed. For that reason it is advantageous to have the inlet end of the bucket slightly larger in width than the end of a can 22. Thus the bottom of the bucket is widened at its inlet end by an integral extension 43 in the direction of movement. Also, the leading side wall 34 is flared forwardly, having a curved section 44.

As described in the aforementioned application Serial No. 731,395 the bucket is slidingly supported upon a member 45 (Figure 3) carried by a pair of driven endless chains, and shifting movement of the bucket toward and away from the cartons is effected by a pair of cam tracks 48 and 49 that engage a roller 52 depending from the bucket itself. Details of construction whereby the bucket slides upon the member 45 may be of any suitable type, such as shown in Serial No. 731,395 or in the application of John F. Currivan, Serial No. 107,121, filed July 27, 1949 for Carton Loading Device now United States Patent No. 2,633,625 issued July 7, 1953.

Since each of the chutes 38, 39 and 40 is kept filled with cans 22, metering means are provided in connection with each chute to allow only one can from each chute to enter a bucket, and to hold the rest of the cans in the chute until the next bucket is in position to receive a can. These metering means, in the illustrated embodiment, take the form of spaced pairs of disks 53 and 54 fixed to a common rotating horizontal shaft 55. Each pair of disks is provided with a series of equally spaced and coaligned peripheral pockets 56 and 57 respectively. The shaft 55 carries the sets of disks above and in the path of the cans 22 in the chutes 38, 39 and 40, so that the peripheral portions 58 of the disks will block passage of the cans in the chute until one of the pockets embraces a can and pushes it toward a bucket 19, whereupon the succeeding peripheral portion 58 blocks the next can until it is forwarded under the influence of the succeeding pocket.

Thus each set of aligned pockets in a pair of disks 53 and 54 serves to meter the cans, or to discharge them one by one to the buckets as the buckets arrive abreast of a chute, and as a bucket arrives abreast of the third chute 40 the last of the three cans is loaded into it and the bucket is ready to begin its lateral movement toward a carton 61 upon the transport.

The shaft 55 carrying the pairs of disks 53 and 54 is driven by an extension of the cartoning machine transport tailshaft, indicated at 62 in Figures 2 and 4. The tailshaft extension 62 carries a bevel gear 63 that drives a mating bevel gear 64 on shaft 65, this in turn having a sprocket 66 to drive shaft 55 by means of a chain 67 and sprocket 68. The shaft 55 is interrupted at an overload release clutch 71 of any suitable type, the one illustrated in Figure 2 being of the type described in detail in Figures 9 and 10 of the co-pending application of John F. Currivan, Serial No. 88,329 filed April 19, 1949 and entitled Carton Loading Device.

In the instant case the shaft 55 is journalled in a pair of pillow block bearings 72 and 73. Bearing 72 is mounted upon a frame 74 (Figure 3) that bridges and is secured to the side walls of the casting 25. Another bracket assembly indicated generally at 75 in Figure 2 carries the bearing 73, as well as the other bearings that support shaft 65, clutch 71, sprocket 68, etc. This assembly 75 comprises plates (Figure 2) 76, 77, 78, 79 and 80 suitably welded together and secured to the casting 25.

As best shown in Figures 4 and 2, the sprocket 68 is angularly adjustable upon its hub 83, to permit adjustment of shaft 55 with respect to the tailshaft extension 62. Also, as shown in Figure 4, an idler sprocket 84 carries the idle run of the chain 67 around the upper corner of the casting 25.

Although the pairs of pocketed disks 53 and 54 for the first chute meters the first cans one by one to the buckets 19, it must be assured that the can so delivered moves out of the way, preferably all of the way to the other end of the bucket, so as to not interfere with the reception of the second can. Similarly, the second can must be out of the way to assure satisfactory reception of the third can. For that reason a kicker or pusher assembly is provided to move the first and second cans fully into each bucket.

Arranged parallel to shaft 55 is a second shaft 85, journalled in pillow block bearings 86 and 87 and driven at a faster speed but in proper timed relationship with shaft 55 by a sprocket 88 on shaft 55, chain 89 and sprocket 90 on shaft 85. A pair of paddles or pushers 91 and 92 are keyed to shaft 85, each being slightly to the right of chutes 38 and 39 and each having a pair of radial arms 93 and 94 (Figure 3) having pads 95 of leather, felt, rubber or the like on their outer ends. Thus after each bucket 19 has received a can 22 from chute 38 it moves toward the next chute 39. But before reaching that position the first paddle or pusher strikes the can and shoves it toward the discharge end of the bucket. After the second can is received from chute 39 the second paddle or pusher strikes it and shoves it up against the third can, to assure that there is room for the first can.

In order to positively assure retention of the cans in the buckets during this loading operation a fixed bar 96 is secured to the frame of the machine, and extending along and above the path of the discharge ends of the buckets 19, assures retention of the cans therein. The right hand end 97 of bar 96 is inclined toward the carton path, so as to permit lateral shifting of the buckets while at the same time providing a limit or guide to retain them in the buckets in the event that they should tend to slip past the leaf spring retaining members 36 and 37.

In view of the relative speed of the transport and loading conveyors the lateral shifting of the buckets toward the cartons is also relatively rapid, and the bucket might roll out from the cans 22 therein, due to their inertia when the lateral bucket shift begins. A guide or cam track 98, inclined toward the cartons, and overlying the inlet ends of the buckets so as to be in the path of the portions of the cans protruding above the bucket side walls, will be engaged by the rearmost can in the bucket as the lateral shifting of the bucket commences, thus assuring retention of the cans in the buckets until they are finally pushed into the cartons.

In order that the cans be firmly pushed into the cartons it is preferred that the device that pushes them does so with a force exerted directly toward the cartons. In the embodiment illustrated in Figure 1 a planetary gear driven pusher assembly indicated generally at 23 is used, similar in construction to that shown and described in the aforesaid application Serial No. 88,329. As described therein, a generally triangular mounting plate 102 is mounted in an overhead bracket 103 for rotation about a vertical axis on about a fixed shaft 104. The plate is rotated at a fixed speed proportional to the rate of movement of the loading conveyor 12 by a gear and chain drive hidden in the housing 105 and protective cover 106 respectively. Three equally spaced vertical shafts 107 (only one appears in Figure 1) are mounted on plate for rotation with respect thereto. A horizontal pusher bar 108 is fixedly secured to each shaft 107 at the bottom thereof and in a plane slightly above the tops of the moving buckets 19. The shafts 107 are connected to the fixed shaft 104 by a planetary drive transmission, which assures that each pusher bar always faces the cartons during the rotation of the triangular mounting plate 102. The three pusher bars 107 are so spaced, and the speed of rotation of the plate 102 is such that one pusher bar will always be effective to push the articles such as cans 22 from each succeeding bucket 19 and into each carton aligned with the buckets. The pusher assembly thereby effectively pushes all three cans from each bucket and into the aligned carton in spite of the resilient resistance offered by the springs 36 and 37.

The correct loading of each carton is dependent upon the placing of three cans 22 into each bucket. Emergencies sometimes arise, wherein one or more of the chutes 38, 39 or 40 might be empty, so that they would not present a can for loading into the bucket. Means are provided for sensing such absence and automatically stopping the entire machine in the event that any one of the chutes becomes empty. Referring particularly to Figures 1, 2 and 5, a substantially U-shaped bracket 109 is supported over the chutes by a pair of rigid arms 111 secured to the casting 25, only one of the pair of arms being visible in Figure 3. A horizontal rod 112 is attached to the vertical legs of the bracket 109 and fixed against rotation. Three elongated fingers 113, 114 and 115 are pivotally mounted upon the rod 112 by bearings 116 at their upper ends. The lower ends of the fingers are curved in the direction of the loading conveyor and normally rest upon the tops of the bottommost cans in the chutes 38—40, but without interfering with their free movement. An elongated cross bar 117 underlies the fingers 113—115, being pivotally mounted upon the rod 112 by bearings 118. The upper ends of the cross bar 117 above the bearings 118 are connected by a rod 119 that carries a cam or abutment 122. A cut-off switch 123 is suitably fixed to the horizontal upper section of the bracket 109. This switch is in the circuit to the driving motor for the entire cartoning machine. It is normally closed, thus permitting motor operation. It has a protruding button or stem 124 that is spring held in protruding position, so that a force must be used to depress it to open the switch.

Clockwise rotation (in Figure 3) of cross bar 117 results, through the cam or abutment 122, in depression of the switch button 124, and opening of the motor circuit. The cross bar 117 is so balanced that it tends to rotate clockwise and so will rest against and be stopped by the switch button 124, but of its own weight it is unable to depress the switch button. Each of the fingers 113—115 has a weight 125 thereon, and each single weight is sufficient when resting upon cross bar 117, to depress bar 117 and open the switch 123. Thus if any chute 38, 39 or 40 does not have a can adjacent its bottom the respective finger will drop into the space normally occupied by the can, and the switch 123 will be opened, stopping the entire machine. In Figure 3 the finger 115 and cross bar 117 are shown in their depressed position which they will occupy when the last can 22 has been removed from the chute.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a conveying system, a first conveyor having a series of open ended and open topped trough-shaped receptacles thereon with their axes arranged transversely to the direction of movement of the conveyor, means for driving said first conveyor at a predetermined speed, a second conveyor adjacent the first conveyor for receiving articles from said receptacles, a third conveyor on one side of said first conveyor for delivering articles to the open ends of said receptacles, a first article transfer device adjacent the discharge end of said third conveyor operative to feed a plurality of articles individually from said third conveyor into each receptacle on said first conveyor, means operative to position such articles within said receptacles, retaining means effective to prevent exit of the articles from the opposite ends of the receptacles, and a second article transfer device operable to eject the articles from each receptacle in turn and to transfer them to said second conveyor.

2. In a conveying system, a first conveyor having a series of open ended and open topped trough-shaped receptacles thereon with their axes arranged transversely to the direction of movement of the conveyors, means for driving said first conveyor at the predetermined speed, a second conveyor adjacent said first conveyor for receiving articles from said receptacles, a third conveyor for delivering articles to the open ends of said receptacles on one side of said first conveyor, a peripherally pocketed rotor mounted for rotation adjacent the end of said third conveyor about an axis perpendicular to the direction of movement of the articles therealong and operative in timed relation to the movement of said first conveyor to feed a plurality of articles individually from said third conveyor into each receptacle on said first conveyor, means operative to position such articles within said receptacles, retaining means effective to prevent exit of the articles from the opposite ends of the receptacles, and transfer means operable to eject the articles from each receptacle in turn and to transfer them to said second conveyor.

3. In a conveying system, a conveyor adapted to move a series of receptacles in sequence along a fixed path in spaced relation, means for driving said conveyor at a predetermined speed, means for feeding articles along a plurality of paths terminating at spaced points along said conveyor, and a rotor mounted adjacent said conveyor at each of said spaced points for rotation about an axis perpendicular to the path of movement of the article toward said conveyor, each of said rotors being formed with at least one pocket on the periphery thereof of such size as to receive but a single article from said feeding means, each of said rotors being operable to transfer one of a series of individual articles from said feeding means into each of the receptacles of said series.

4. In a conveying system, a first conveyor embodying and adapted to move in sequence along a fixed path a series of trough shaped receptacles each having spaced side walls extending transversely of said conveyor, a series of conveyors for carrying articles in paths intersecting the path of the receptacles at succeeding spaced points; and a transfer device disposed adjacent each of said series of conveyors operative in timed relation to the movement of said first conveyor to transfer articles individually from the associated conveyor of said series into each receptacle of said series on said first conveyor as such receptacles become aligned with such transfer device whereby a group of articles equal in number to the number of transfer devices is deposited in each said receptacle, each of said transfer devices comprising a peripherally pocketed rotor mounted for rotation about an axis perpendicular to the path of movement of the articles along the associated conveyor of said series.

5. In a conveying system, a conveyor adapted to move a series of receptacles in sequence along a fixed path, means for driving said conveyor at a predetermined speed, means for feeding articles along a plurality of paths terminating at spaced points along said conveyor, a peripherally pocketed rotor mounted adjacent said conveyor at each of said spaced points for rotation about an axis perpendicular to the path of movement of the articles toward said conveyor, each of said rotors being operative to transfer sequentially an article from said feeding means into each of the receptacles of said series, a second conveyor adjacent said first conveyor for receiving articles from said receptacles, and transfer means operable to simultaneously eject all of the articles from each receptacle in turn and to transfer them to said second conveyor.

6. In a conveying system, a first conveyor having a series of open ended and open topped trough shaped receptacles thereon with their axes arranged transversely to the direction of movement of the conveyor; means for driving said first conveyor at a predetermined speed; a series of conveyors for delivering articles to the open ends of said receptacles; peripherally pocketed wheels overlying each of said series of conveyors and rotating about horizontal axes perpendicular to the direction of movement of the articles on said series of conveyors and operative to feed articles singly from each of the conveyors of said series to each receptacle on said first conveyor; and means overlying said receptacles and operative to dispose articles in said receptacles so as to provide room for subsequent reception of succeeding articles.

7. In a conveying system, a first conveyor having a series of open ended and open topped trough shaped receptacles thereon with their axes arranged transversely to the direction of movement of the conveyor; means for driving said first conveyor at a predetermined speed; a series of conveyors for delivering articles to the open ends of said receptacles on one side of said first conveyor; peripherally pocketed wheels overlying each of said series of conveyors and rotating about horizontal axes perpendicular to the direction of movement of the articles on said series of conveyors and operative to feed articles singly from each of the conveyors of said series to each receptacle on said first conveyor; means overlying said receptacles and operative to dispose articles in said receptacles so as to provide room for subsequent reception of succeeding articles; and retaining means effective to prevent exit of the articles from the opposite ends of the receptacles.

8. In a conveying system, a first conveyor having a series of open ended and open topped trough shaped receptacles thereon with their axes arranged transversely to the direction of movement of the conveyor; means for driving said first conveyor at a predetermined speed; a second conveyor adjacent said first conveyor for receiving articles from said receptacles; a series of conveyors for delivering articles to the open ends of said receptacles on one side of said first conveyor; means adjacent the discharge ends of each of the conveyors in said series, operative to feed articles singly from each of the conveyors of said series to each receptacle on said first conveyor; means adjacent said first conveyor and operative to move articles toward the discharge ends of said receptacles to provide room for subsequent reception of succeeding articles from the conveyors of said series; retaining means effective to prevent exit of the articles from the opposite ends of the receptacles; and transfer means operable to simultaneously eject all of the articles from each receptacle in turn and to transfer them to said second conveyor.

9. In a conveying system, a first conveyor having a series of open ended and open topped trough shaped receptacles thereon with their axes arranged transversely to the direction of conveyor movement; means for driving said first conveyor at a predetermined speed; a second conveyor adjacent but spaced from said first conveyor for receiving articles from said first conveyor; a series of conveyors for delivering articles to the open ends of said receptacles on one side of said first conveyor; means adjacent the discharge ends of each of the conveyors in said series operative to feed articles singly from each of the conveyors of said series to each receptacle on said first conveyor; means adjacent said first conveyor and operative to move articles toward the discharge ends of said receptacles to provide room for subsequent reception of succeeding articles from the conveyors of said series; retaining means effective to prevent exit of the articles from the opposite ends of the receptacles; means operative to shift the receptacles laterally to a position closely adjacent said second conveyor; and transfer means operable to simultaneously eject all of the articles from each receptacle in turn and to transfer them to said second conveyor.

10. In the apparatus described in claim 9, means operative to shift the articles in the receptacles simultaneously with the shifting movement of the receptacles, whereby the articles retain their position with respect to the receptacles.

11. In the apparatus described in claim 9, stationary cam means overlying said first conveyor and spaced above the receptacle walls but in the path of the articles protruding above the receptacle walls, and operative to shift the articles in the receptacles simultaneously with the lateral shifting movement of the receptacles, whereby the articles retain their position with respect to the receptacles.

12. In the apparatus described in claim 9, stationary cam means overlying said first conveyor and spaced above the receptacle walls but in the path of the articles protruding above the receptacle walls, and operative to shift the articles in the receptacles simultaneously with the lateral shifting movement of the receptacles whereby the articles retain their position with respect to the receptacles; and means adjacent the outlet end of each receptacle effective to prevent discharge of the articles therefrom except in response to the positive force exerted by said transfer means.

13. In a conveying system, a conveyor adapted to move a series of receptacles in sequence along a fixed path, means for driving said conveyor at a predetermined speed, means for feeding articles along a plurality of paths each terminating at one of a like plurality of spaced points along said conveyor, a peripherally pocketed rotor mounted adjacent said conveyor at each of said spaced points for rotation about an axis perpendicular to the path of movement of the articles toward said conveyor, each of said rotors being operative to transfer sequentially an article from said feeding means into each of the receptacles of said series, and means rendered inoperative by the presence of articles in all of said paths for disabling said conveyor driving means.

14. In a conveying system, a first conveyor, a second conveyor adjacent said first conveyor, a series of supply conveyors for feeding articles to each of a plurality of spaced points along said first conveyor, an article transfer device adjacent each of said spaced points and operable in timed relation to the movement of said first conveyor to deposit articles on said first conveyor in groups consisting of an article from each of said series of supply conveyors, and article transfer means operable to transfer the arranged groups of articles in sequence from said first conveyor to said second conveyor.

References Cited in the file of this patent

UNITED STATES PATENTS

| Number | Name | Date |
|---|---|---|
| 334,274 | Norton | Jan. 12, 1886 |
| 1,118,425 | Johnson | Nov. 24, 1914 |
| 1,589,079 | Johnson | June 15, 1926 |
| 2,053,418 | Braren | Sept. 8, 1936 |
| 2,092,773 | Nordquist et al. | Sept. 14, 1937 |
| 2,133,248 | Jones | Oct. 11, 1938 |
| 2,325,816 | Waters | Aug. 3, 1943 |
| 2,335,646 | Chalmers | Nov. 30, 1943 |
| 2,440,866 | Malhiot | May 4, 1948 |
| 2,585,558 | Lakso | Feb. 12, 1952 |

FOREIGN PATENTS

| Number | Country | Date |
|---|---|---|
| 629,944 | Great Britain | Oct. 3, 1949 |